Sept. 28, 1965     V. C. HANSEN     3,208,468
DEVICE FOR CONTINUOUS MIXING OF LIQUIDS
Filed Sept. 23, 1963
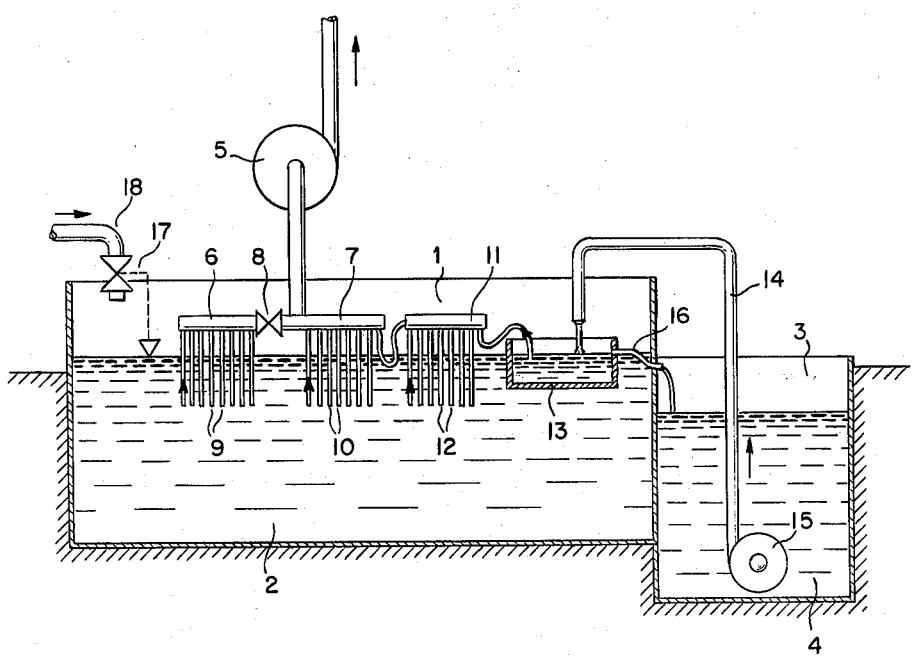
INVENTOR

United States Patent Office 3,208,468
Patented Sept. 28, 1965

3,208,468
DEVICE FOR CONTINUOUS MIXING OF LIQUIDS
Volmer Christian Hansen, Ballerup Byvej 278,
Ballerup, Denmark
Filed Sept. 23, 1963, Ser. No. 310,552
3 Claims. (Cl. 137—266)

The present invention relates to a device for continuous mixing of liquids comprising at least two containers having substantially the same liquid level, each container being provided with a suction conduit discharging into a common conduit for the mixed liquid.

Most often mixing of liquids takes place in a container, in which measured quantities of the different liquids are poured, whereafter the mixed liquid is transferred to the place where it is used. It is not possible to obtain a continuous mixing in this way, and the method is therefore unsuitable for instance in automatic plant watering systems, by which fertilizer liquid is to be added to the water. Moreover, there will exist a risk of making mistakes by the mixing of the measured liquid portions.

Therefore, mixing systems have been developed in which a common pump takes in liquid from different liquid containers through branch lines having mutually different hydraulic resistances. In this way a continuous mixing is achieved, but the ratio of mixture will disadvantageously be varying with the flow rate, i.e. the quantity of liquid passing by per time unit, because the hydraulic resistances of the mutually different branch lines do not vary exactly proportionally to each other, particularly not in the transition zone between laminar and turbulent flow. This inaccuracy is becoming very pronounced when one of the liquid components makes up only a few percent of the total mixed liquid quantity.

The object of the present invention is to develop a device for the continuous mixing of the different liquid components in such a way that the ratio of mixing remains substantially independent of the flow rate, i.e. constant at varying liquid velocities in the system.

This is according to the invention obtained by the fact that the common conduit is branched off into a large number of identical branch conduits, of which the end of at least one is immersed into a first liquid container, and at least one of the others into a second liquid container.

As the branch conduits of first degree are mutually identical, and since they transfer liquid from containers having the same liquid level, all of these branch conduits must have the same flow rate regardless of the actual value of the flow rate. Therefore, the ratio of mixing will remain constant at varying flow rates, and the ratio of mixing is simply equal to the proportion between the numbers of branch conduits immersed into the different containers. It will be possible to use for instance 50 thin plastic hoses without involving any large costs, whereby for instance a mixing ratio of 1:50 may be achieved.

If the mixture is to contain very small quantities of a certain liquid component, one of the branch conduits of first degree may according to the invention be further branched off into a large number of identical branch conduits of second degree, of which the end of at least one is immersed into a first liquid container, and the others into other liquid containers. If there are 50 branch conduits of the first degree, and equally 50 of second degree, the flow rate of each second degree conduit will be $1/50 \times 1/50 = 1/2500$ of the total flow rate. Thus, a mixing ratio of 1:2500 may be achieved. By suitably combining the branch conduits of the first and second degree together, it will be possible to obtain a large number of mixing ratios with very little difference between any two consecutive ratios.

This method of repeated branching off may be further developed. According to the invention one of the branch conduits of the second degree may be further branched off into a number of identical branch conduits of third degree, of which one may be branched off into a number of branch conduits of fourth degree.

In the drawing is shown an embodiment of a device according to the invention for mixing fertilizer liquid and water.

The device, which is schematically shown, comprises a container 1 for water 2 and a lower situated container 3 for fertilizer liquid 4. A pump 5 transfers the mixture of water and fertilizer liquid to a plant watering system. The pump 5 takes liquid in from two suction manifolds 6 and 7, of which the suction box 6 can be cut off by means of a valve 8. From the suction manifold 6 are branched eight thin plastic hoses 9 immersed into the water 2, and from the suction manifold 7 are branched eight plastic hoses 10, of which one is connected with a further suction manifold 11. From the suction manifold 11 are branched eight plastic hoses 12, of which one is immersed into the liquid contained in a fertilizer liquid container 13 which is floating in the water 2 in the container 1.

The fertilizer liquid container 13 is supplied with fertilizer liquid through a pipe 14 connected with an immersed pump 15 placed at the bottom of the container 3. This pump 15 is driven continuously, and the excess of fertilizer liquid leaves the container 13 through an overflow tube 16 being connected with the container 3. In this way a constant liquid level in the fertilizer liquid container 13 is achieved, whereby also the depth of immersion of this container in the water 2 will remain constant. The weight of the container 13 is so adjusted that the liquid in this container is in level with the water in the container 1. The liquid level in the container 1 is kept substantially constant by means of a float valve 17 governing the water supply through a feed pipe 18.

When the valve 8 is shut, each of the hoses 10 will conduct $1/8$ of the total liquid quantity, whereby each of the hoses 12 will conduct $1/8 \cdot 1/8 = 1/64$ of the total liquid quantity. The hose interconnecting the suction manifolds 7 and 11 should be somewhat shorter than the rest of the hoses 10 to compensate for the resistance of the hoses 12. If the hoses 12 have the same dimensions as the hoses 10, this correction will become very little, for instance less than 10% of the length of the hoses 10.

When the valve 8 is opened, each of the hoses 9 and 10 will transfer $1/16$ of the total liquid quantity, and each of the hoses 12 consequently $1/8 \cdot 1/16 = 1/128$ of the total liquid quantity. Therefore, the quantity of fertilizer liquid will make up $1/128$ of the total liquid quantity. The amount of fertilizer liquid may be increased by shifting one or more of the hoses 12 over to the fertilizer liquid container 13.

The principle of repeated branching off according to the invention may also be applied at the delivery side of a pump.

I claim:

1. Device for continuous mixing of liquids comprising at least two containers having substantially the same liquid level, each container being provided with a suction conduit discharging into a common conduit for the mixed liquid, characterized in that the common conduit is branched off into a large number of identical branch conduits of first degree, of which the end of at least one is immersed into a first liquid container, and at least one of the others into a second liquid container.

2. Device as claimed in claim 1, characterized in that one of the branch conduits of first degree is further branched off into a large number of identical branch conduits of second degree, of which the end of at least one is immersed into a first liquid container, and the others into other liquid containers.

3. Device as claimed in claim 2, characterized in that one of the branch conduits of the second degree is further branched off into a number of identical branch conduits of third degree, of which one may be branched off into a number of branch conduits of fourth degree.

References Cited by the Examiner
UNITED STATES PATENTS

| | | | |
|---|---|---|---|
| 1,472,238 | 10/23 | Berkey | 137—255 |
| 2,935,057 | 5/60 | Perlewitz | 137—266 |

M. CARY NELSON, *Primary Examiner.*

HENRY T. KLINKSIEK, *Examiner.*